UNITED STATES PATENT OFFICE.

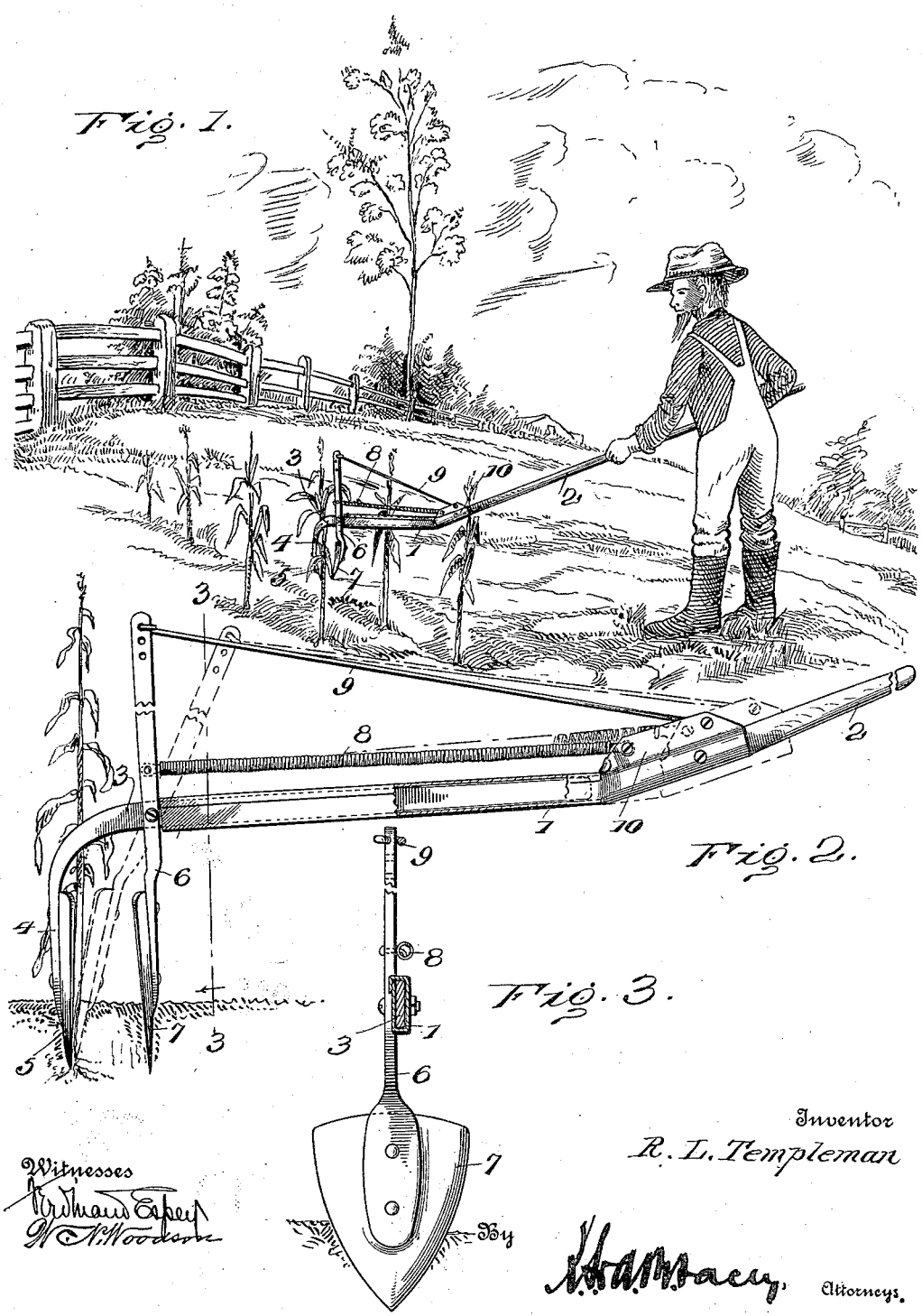

ROBERT L. TEMPLEMAN, OF RUBY, VIRGINIA.

PLANT-PULLER.

1,045,216.  Specification of Letters Patent.  Patented Nov. 26, 1912.

Application filed April 3, 1912. Serial No. 688,258.

*To all whom it may concern:*

Be it known that I, ROBERT L. TEMPLEMAN, citizen of the United States, residing at Ruby, in the county of Stafford and State of Virginia, have invented certain new and useful Improvements in Plant-Pullers, of which the following is a specification.

This invention has relation to plant pullers especially adapted to be used for thinning corn, although it may be used for pulling plants or weeds from the soil about the plants of a standing crop.

With the above object in view, the structure consists of a sleeve attached to a staff and in which is slidably mounted the shank of a blade. A lever is pivotally attached to the shank of the said blade and is also pivotally connected by means of a link with the sleeve and carries a blade. These blades are normally held in spaced relation by a spring which is connected at one end with the lever and at the other end with the sleeve. When, however, the first-mentioned blade is inserted in the soil and a pull is exerted on the same so that the shank moves longitudinally through the sleeve, the last-mentioned blade moves toward the first-mentioned blade and the plant to be removed is gripped between the same, and by moving the puller in an upward direction the said plant is extracted from the soil.

In the accompanying drawing Figure 1 is a perspective view showing the operator in the act of using the puller. Fig. 2 is a side elevation of the puller. Fig. 3 is a sectional view of the same cut on the line 3—3 of Fig. 2.

Corresponding and like parts are referred to in the following description and indicated in all the views of the accompanying drawings by the same reference characters.

The puller consists of a sleeve 1 in which the end of a staff 2 is inserted and secured in any suitable manner. The shank 3 is slidably mounted in the sleeve 1 and is provided with a down-turned end 4 to which is attached a blade 5. A lever 6 is pivotally mounted upon the shank 3 and carries at its lower end a blade 7 which is juxtaposed with relation to the blade 5. A coil spring 8 is connected at one end with the lever 6 at a point above the shank 3, and at its other end is connected with the sleeve 1. This spring is under tension with a tendency to hold the lever 6 against the end of the sleeve 1. A rod 9 is pivotally and adjustably connected at one end with the upper end of the lever 6 and is pivotally connected at its other end with the sleeve 1. The pivotal connection between the rod 9 and the lever 6 serves as a fulcrum upon which the said lever may swing when the shank 3 is moved longitudinally in the sleeve 1, whereby the blade 7 is caused to approach the blade 5. Specifically the sleeve 1 is provided with flanges 10 at its rear end, and it is between these flanges that the rear ends of the spring 8 and the rod 9 are secured. Therefore the said flanges protect the rear ends of the spring and the rod against the foliage of plants and prevent the foliage from becoming tangled with the said parts when the puller is in operation, as hereinafter described.

In operation the puller is used as follows: By swinging the staff 2 vertically the blade 5 is inserted behind an undesirable plant. At the same time the blade 7 is projected into the soil. The staff 2 is then given a pull longitudinally which, by reason of the fact that the blade 5 is anchored in the ground, will cause the shank 3 to slide longitudinally in the sleeve 1. This longitudinal movement on the part of the shank 3 will cause the lever 6 to swing upon its pivotal connection with the shank 3 inasmuch as the rod 9 confines the upper end of the said lever at a predetermined distance from that portion of the sleeve 1 to which it connects the said lever. Therefore, upon this movement the blade 7 will approach the blade 5 and the undesirable plant is grasped between the blades. While the blades are in this position the puller is given an upward movement and the said plant is thereby extracted from the soil. As soon as the blades are lifted from the soil, the tension of the spring 8 comes into play and the lever 6 is drawn back against the end of the sleeve 1, which action separates the blade 7 from the blade 5, and the plant extracted is liberated and is permitted to fall upon the surface of the soil. Therefore, it will be seen that a puller of simple structure is provided and that it is automatic in its action in so far as the removal of an undesirable plant from the soil and its ejection is concerned. By the use of this puller a crop may be easily and quickly thinned to a proper stand, and also the weeds standing about the desirable plants may be easily and quickly removed.

Having thus described the invention, what is claimed as new is:

1. A puller comprising a blade mounted for movement in a direction longitudinal of the body portion of the puller, and a blade pivotally connected with the first-mentioned blade and adapted to move toward the same upon the longitudinal movement of the first-mentioned blade.

2. A puller comprising a sleeve, a shank slidably mounted therein, a blade carried by the shank, a lever fulcrumed upon the shank, a blade carried by said lever, a spring connected with the lever and sleeve, and a rod pivotally connected with the lever and sleeve.

3. A puller comprising a sleeve, a shank slidably mounted therein and having a down-turned end, a blade carried upon the down-turned end, a lever fulcrumed upon the shank, a blade carried by the lever being juxtaposed with relation to the first-mentioned blade, a spring connecting the lever and the sleeve, and a rod pivotally connected with the lever and the sleeve.

4. A puller comprising a sleeve, a shank slidably mounted therein, a blade carried by the shank, a lever fulcrumed to the shank and normally resting against the end of the sleeve, a blade carried by the lever, a spring connected with the lever and the sleeve, and a rod pivotally connected with the lever and the sleeve.

5. A puller comprising a sleeve, a shank slidably mounted therein, a blade carried by the shank, a lever pivotally connected with the shank, a blade carried by the lever, a spring connected with the lever and the sleeve, and a rod pivotally and adjustably connected with the lever and pivotally connected with the sleeve.

6. A puller comprising a sleeve, a shank slidably mounted therein, said sleeve having upstanding flanges, a shank slidably mounted in the sleeve, a blade carried by the shank, a lever fulcrumed to the shank, a blade carried by the lever, a spring connected at one end with the lever and at its other end with the sleeve between the flanges, and a rod pivotally connected at one end with the lever and at its other end with the sleeve between the flanges.

In testimony whereof I affix my signature in presence of two witnesses.

ROBERT L. TEMPLEMAN. [L. S.]

Witnesses:
J. D. YOAKLEY,
SAMUEL N. ACKER.

---

Copies of this patent may be obtained for five cents each, by addressing the "Commissioner of Patents, Washington, D. C."